US012798683B2

(12) United States Patent
Favaretto

(10) Patent No.: US 12,798,683 B2
(45) Date of Patent: Nov. 17, 2026

(54) CAR WITH QUICK REPLACEMENT OF THE SPARK PLUGS

(71) Applicant: FERRARI S.P.A., Modena (IT)

(72) Inventor: Fabrizio Favaretto, Modena (IT)

(73) Assignee: FERRARI S.P.A., Modena (IT)

( * ) Notice: Subject to any disclaimer, the term of this patent is extended or adjusted under 35 U.S.C. 154(b) by 270 days.

(21) Appl. No.: 18/629,166

(22) Filed: Apr. 8, 2024

(65) Prior Publication Data

US 2024/0343310 A1 Oct. 17, 2024

(30) Foreign Application Priority Data

Apr. 13, 2023 (IT) ........................ 102023000007068

(51) Int. Cl.
*B62D 25/18* (2006.01)

(52) U.S. Cl.
CPC .................................... *B62D 25/18* (2013.01)

(58) Field of Classification Search
CPC ...... B62D 25/16; B62D 25/18; B62D 25/182; B62D 25/184; B60K 5/00; B60K 2005/006; F02P 15/02
See application file for complete search history.

(56) References Cited

U.S. PATENT DOCUMENTS 5,360,079 A * 11/1994 Ichikawa .................. F02F 1/24 123/468
6,003,933 A * 12/1999 Rinklin .................. B62D 25/08 293/154
6,910,929 B2 * 6/2005 Yasuda ................... F02B 75/20 440/77
7,000,726 B2 * 2/2006 Kobayashi ........... B62D 25/081 180/291
8,453,775 B2 * 6/2013 Belzile ................... B60K 11/02 180/69.1

FOREIGN PATENT DOCUMENTS

DE 102014116612 A1 5/2016
DE 102018109710 A1 * 10/2019 ....... F02M 35/10144
EP 0808765 A1 11/1997
GB 851332 A * 10/1960 ............. B62D 35/00
JP 2003276454 A 9/2003
JP 2007296994 A * 11/2007

OTHER PUBLICATIONS

Italian Search Report in IT Application No. 202300007068 mailed Oct. 20, 2023, an English Translation attached hereto (6 pages).

* cited by examiner

*Primary Examiner* — Laura Freedman
(74) *Attorney, Agent, or Firm* — Leason Ellis LLP

(57) ABSTRACT

A car has an engine provided with a plurality of spark plugs and connected to two drive wheels, and a support frame defining a pair of housing compartments, each of which houses on the inside a relative drive wheel, and is delimited by a back wall, which faces at least part of the spark plugs of the engine, and is provided with at least one opening configured to allow a tool to remove at least one spark plug from the engine and to allow at least one spark plug to be mounted on the engine.

6 Claims, 4 Drawing Sheets

CAR WITH QUICK REPLACEMENT OF THE SPARK PLUGS

CROSS-REFERENCE TO RELATED APPLICATIONS

This patent application claims priority from Italian patent application no. 102023000007068 filed on Apr. 13, 2023, the entire disclosure of which is incorporated herein by reference.

TECHNICAL FIELD

The present invention relates to a car.

BACKGROUND

In particular, the present invention relates to a car of the type comprising a support frame defining at least part of a bottom floor of the car; a passenger compartment mounted on the support frame and projecting upwards from the bottom floor; and an engine for moving the car.

The engine is mounted in a rear area of the car, in particular parallel to a forward moving direction of the car, and is connected to two drive wheels mounted in respective housing compartments obtained in the support frame and delimited by respective back walls interposed between the drive wheels and the engine.

Each drive wheel is connected to the support frame by means of the interposition of a suspension.

The engine is provided with a plurality of cylinders associated with respective spark plugs projecting from the engine in the direction of the back walls of the housing compartments of the drive wheels, in particular crosswise to the forward moving direction of the car.

The known cars of the type described above have several drawbacks mainly deriving from the fact that, due to the relatively reduced space between the engine and the back walls of the housing compartments of the drive wheels, the replacement of the spark plugs entails the removal of the entire engine and is thus relatively long, complex and expensive.

SUMMARY

The object of the present invention is to provide a car which is exempt from the drawbacks described above and which is simple and cost-effective to manufacture.

According to the present invention, there is provided a car as claimed in the appended claims.

BRIEF DESCRIPTION OF THE DRAWINGS

The present invention will now be described with reference to the accompanying drawings, which illustrate a non-limiting example embodiment thereof, wherein.

DESCRIPTION OF EMBODIMENTS

Figure 1:
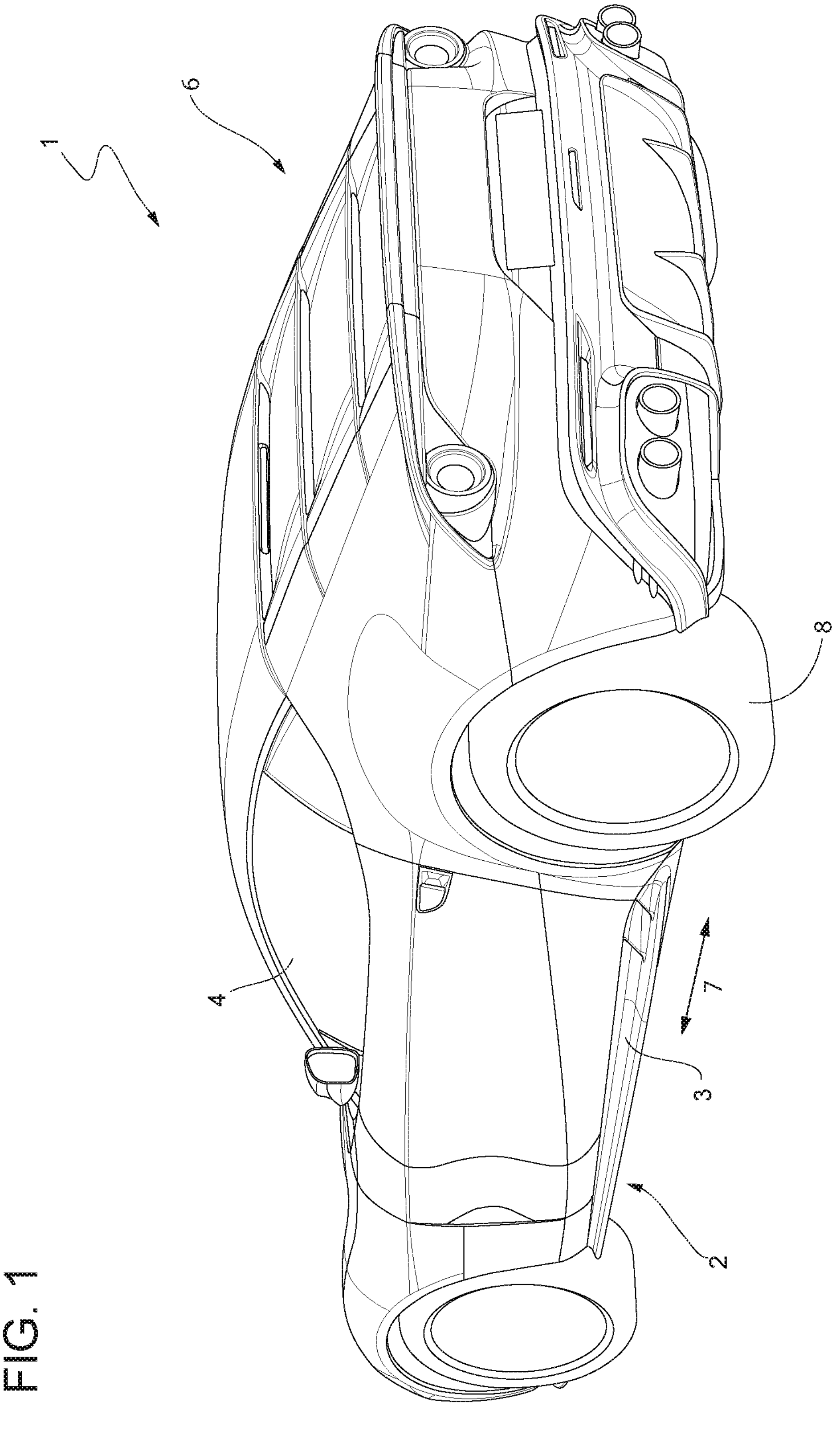
FIG. 1 is a schematic perspective view, with parts removed for clarity, of a preferred embodiment of the car of the present invention.
Figure 2:
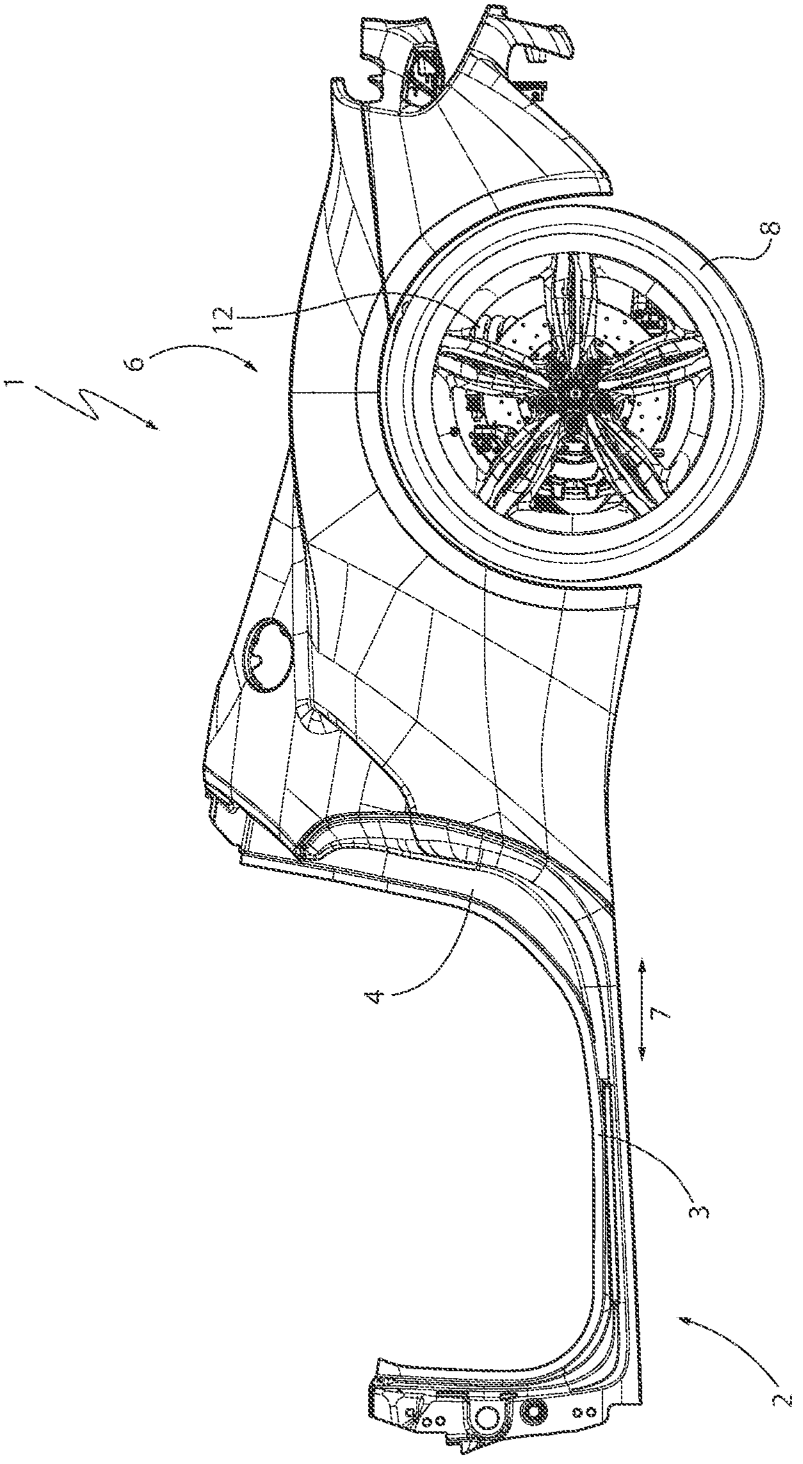
FIG. 2 is a schematic side view, with parts removed for clarity, of a detail of the car of FIG. 1.
Figure 3:
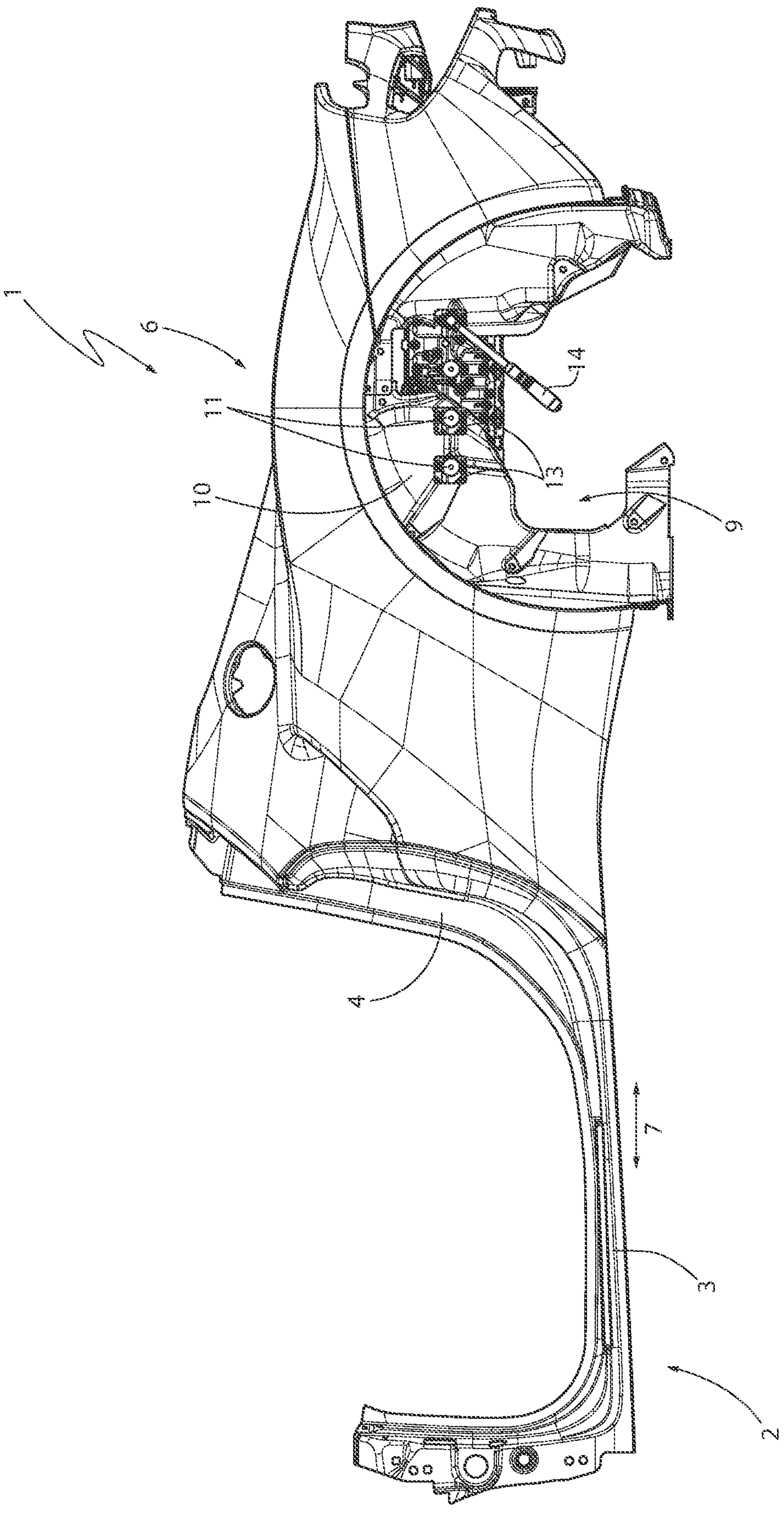
FIG. 3 is a first schematic side view, with parts removed for clarity, of a detail of FIG. 2.
Figure 4:
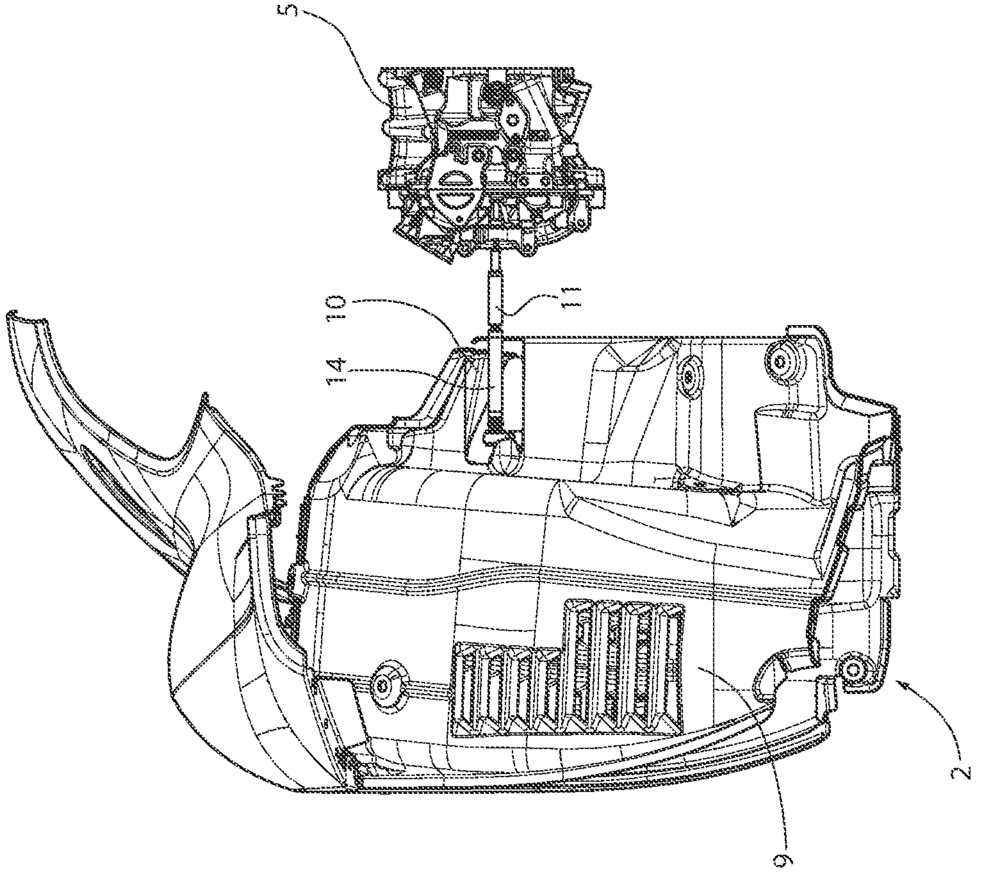
FIG. 4 is a second schematic side view, with parts in section and parts removed for clarity, of the detail of FIG. 3.

With reference to FIG. 1, reference numeral 1 indicates, as a whole, a car, in particular a sports car, comprising a support frame 2 defining at least part of a bottom floor 3 of the car 1, and a passenger compartment 4 mounted on the frame 2 and projecting upwards from the floor 3.

The car 1 further comprises an engine 5 of known type, which is mounted in the centre of a rear area 6 of the frame 2, in particular parallel to a forward moving direction 7 of the car 1, and is connected in a known manner to two rear drive wheels 8 of the car 1.

The frame 2 is configured to define two housing compartments 9, each of which houses on the inside a relative wheel 8, and is delimited by a back wall 10 interposed between the wheel 8 and the engine 5.

The engine 5 has a plurality of cylinders, known and not shown, provided with respective spark plugs 11 projecting from the engine 5 in the direction of the back walls 10 of the housing compartments 9, in particular crosswise to the direction 7.

Each wheel 8 is connected to the frame 2 by means of the interposition of a suspension 12, which extends through the relative compartment 9, and is interposed between the wall 10 of the relative compartment 9 and the wheel 8.

The wall 10 of each compartment 9 has, for each spark plug 11, a respective opening 13 substantially facing the spark plug 11 crosswise to the direction 7.

In this case, the openings 13 of the wall 10 of each compartment 9 are made so that they result to be accessible by the personnel in charge by simply removing the relative wheel 8 and the relative suspension 12.

The removal of the wheel 8 and of the suspension 12 allows the personnel in charge to access the openings 13, to remove the spark plugs 11 from the engine 5 by means of a tool 14 adapted to engage each spark plug 11 through the relative opening 13, and to mount new spark plugs 11 on the engine 5 by inserting each spark plug 11 and the tool 14 through the relative opening 13.

According to a variation not shown, the openings 13 of the wall 10 of each compartment 9 are made so that they result to be accessible by the personnel in charge by simply removing the relative wheel 8.

According to a further variation not illustrated, the number of openings 13 is different from the number of spark plugs 11 and each opening 13 allows accessing at least two spark plugs 11.

The car 1 has several advantages mainly deriving from the fact that the replacement of the spark plugs 11 does not entail the removal of the entire engine 5, but only of the drive wheels 8 or of the drive wheels 8 and of the relative suspensions 12.

The invention claimed is:

1. A car comprising an engine (5) to move the car; a plurality of spark plugs (11) mounted on the engine (5); two drive wheels (8) connected to the engine (5); a support frame (2) defining a pair of housing compartments (9) for the drive wheels (8); each housing compartment (9) being delimited by a back wall (10) facing at least part of the spark plugs (11) of the engine (5); and characterized in that the back wall (10) of each housing compartment (9) is provided with at least one opening (13) configured to allow a tool (14) to remove at least one spark plug (11) from the engine (5) and to allow at least one spark plug (11) to be mounted on the engine (5).

2. The car according to claim 1 and further comprising, for each drive wheel (8), a respective suspension (12) interposed between the support frame (2) and the drive wheel (8).

3. The car according to claim 2, wherein the openings (13) of the back wall (10) of each housing compartment (9) are arranged so that they can be accessed by the tool (14) after having removed only the relative drive wheel (8) from the housing compartment (9).

4. The car according to claim 2, wherein the openings (13) of the back wall (10) of each housing compartment (9) are arranged so that they can be accessed by the tool (14) after having removed the relative drive wheel (8) and the relative suspension (12) from the housing compartment (9).

5. The car according to claim 1, wherein the engine (5) is mounted in a rear area (6) of the car parallel to a forward moving direction (7) of the car.

6. The car according to claim 1, wherein the spark plugs (11) project from the engine (5) in the direction of the back walls (10) of the housing compartments (9) of the drive wheels (8) crosswise to a forward moving direction (7) of the car.

* * * * *